United States Patent [19]

Brink

[11] Patent Number: 5,513,743
[45] Date of Patent: May 7, 1996

[54] BELT CONVEYOR SKIRT SEAL ARRANGEMENT

[75] Inventor: Arend J. Brink, Witbank, South Africa

[73] Assignee: SLIC Trading Company Limited, Douglas, Isle of Man

[21] Appl. No.: 326,934

[22] Filed: Oct. 21, 1994

[51] Int. Cl.⁶ .................................................. B65G 21/20
[52] U.S. Cl. ....................................................... 198/836.1
[58] Field of Search ........................ 198/836.1, 836.2, 198/836.3, 836.4

[56] References Cited

U.S. PATENT DOCUMENTS

| | | | |
|---|---|---|---|
| 3,344,909 | 10/1967 | Hansen et al. | 198/836.1 |
| 4,231,471 | 11/1980 | Gordon | 198/836.1 |
| 4,641,745 | 2/1987 | Skates | 198/836.1 |
| 4,950,399 | 8/1990 | Hann, Sr. | 198/836.1 X |
| 4,989,727 | 2/1991 | Gordon | 198/386.1 |
| 5,016,747 | 5/1991 | Veenhof | 198/836.1 X |
| 5,129,508 | 7/1992 | Shelstad | 198/860.3 |
| 5,154,280 | 10/1992 | Mott | 198/836.1 X |

FOREIGN PATENT DOCUMENTS

| | | | |
|---|---|---|---|
| 0213410 | 9/1984 | Germany | 198/836.1 |
| 2014530 | 8/1979 | United Kingdom | 198/836.1 |
| 2260741 | 4/1993 | United Kingdom . | |

*Primary Examiner*—James R. Bidwell
*Attorney, Agent, or Firm*—Jones, Tullar & Cooper

[57] ABSTRACT

A skirt seal arrangement for a conveyor belt which includes an elongate track element and an elongate skirt seal which has a base which is slidably engageable with the track element and a lower edge which is engageable in sealing contact with an opposing surface of the conveyor belt.

5 Claims, 2 Drawing Sheets

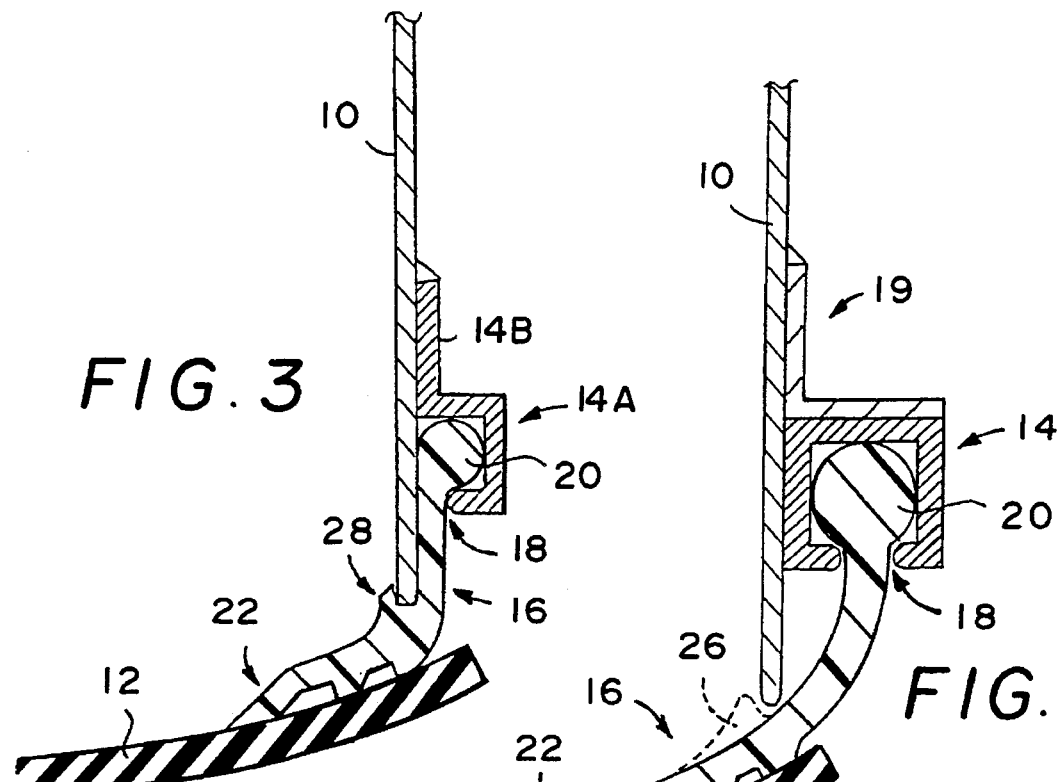
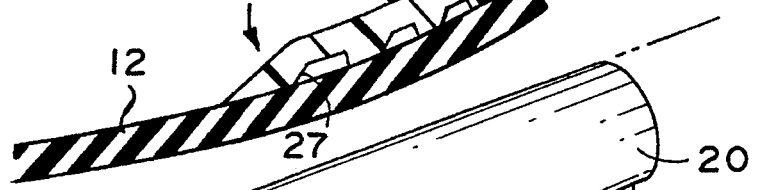
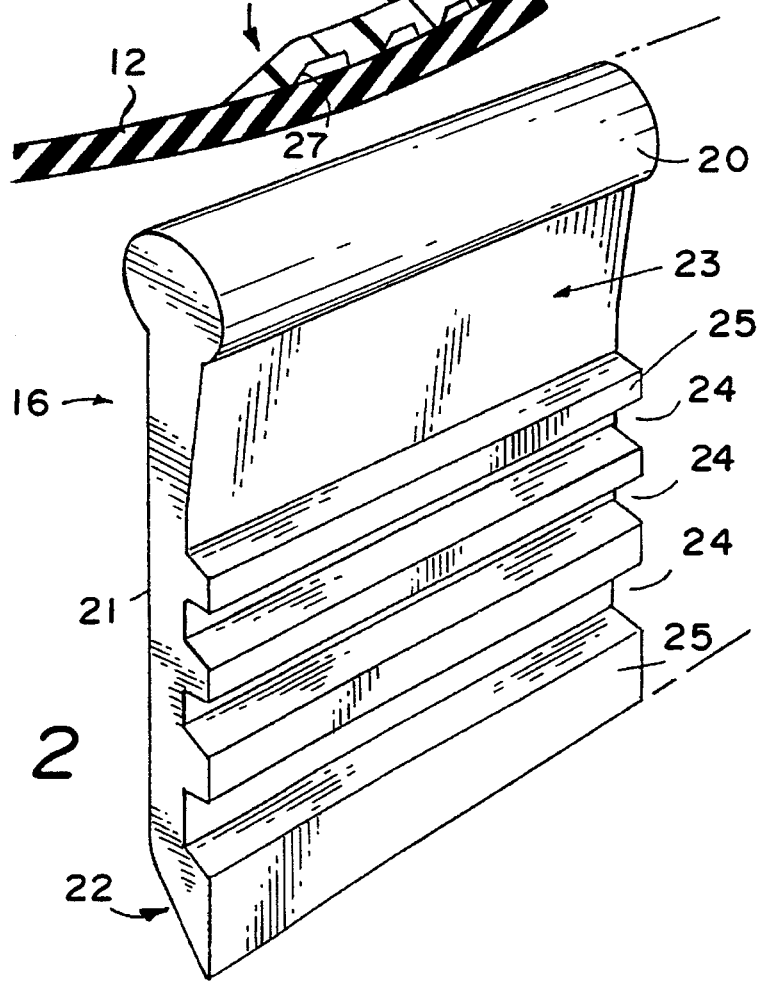

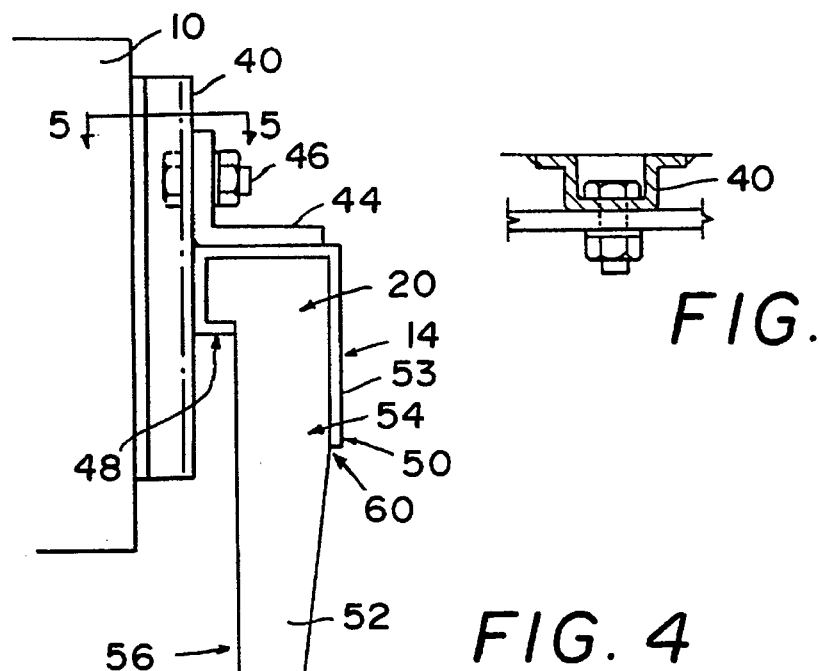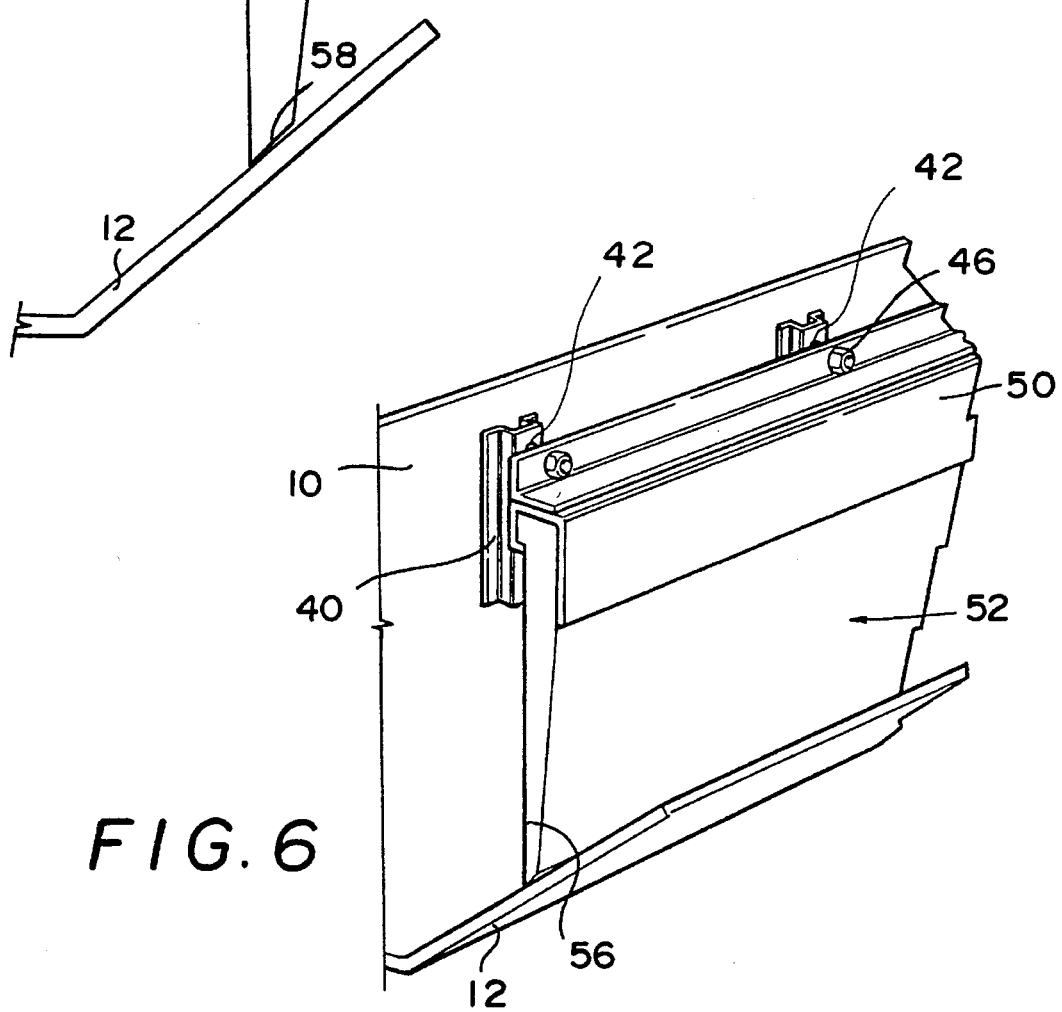

5,513,743

BELT CONVEYOR SKIRT SEAL ARRANGEMENT

BACKGROUND OF THE INVENTION

This invention relates to a skirt seal for sealing the base of a loading chute to a conveyor belt which passes through or below the chute.

A seal of the aforementioned type prevents material and particularly fine particulate material from escaping from the conveyor belt through a gap between the base of the loading chute and the conveyor belt. As the chute skirt seal is in constant running contact with a surface of the conveyor belt, it wears rapidly and requires frequent replacement.

The applicant is aware of skirt seals which are fixed to the outer wall of the loading chute by means of clamping strips. To replace this type of seal is tedious and time consuming. This type of seal also has a relatively large contact area with the belt surface and, with the ingress of abrasive material between the contact area and the belt surface, unacceptable belt wear occurs.

SUMMARY OF THE INVENTION

The invention provides a skirt seal arrangement for a conveyor belt which includes an elongate track element and an elongate skirt seal which is slidably engageable with the track element and which includes at least one sealing surface which is sealing contact with the conveyor belt.

The skirt seal may be slidably disengagable from the track element.

The track element may include an elongate cavity and the skirt seal may have an elongate formation which is moved into the cavity by sliding movement of the skirt seal relative to the track element.

The track element may have a slot which extends to the cavity and the skirt seal may have a neck portion which passes through the slot.

The track element may be fixed to a wall of a chute of the conveyor.

The track element may be vertically adjustable relatively to the wall of the chute.

The skirt seal may extend from the track element below a lower edge of the chute wall to the conveyor belt.

The skirt seal may include a formation which engages with the said lower edge.

The skirt seal may have at least two of the said sealing surfaces which are spaced by a groove. Further, the skirt seal may have a tapered edge which is remote from the track element and which is in sealing contact with the conveyor belt.

The invention also provides a skirt seal for a conveyor belt which includes an elongate body which is made from a resilient material, a bead formation along a first edge of the body which extends from one side of a neck portion of the body, and at least one sealing surface on an opposing side of the neck portion which is adapted to be brought into sealing contact with the conveyor belt.

The skirt seal may have at least two of the said sealing surfaces separated by a groove.

An edge of the body may be tapered. This tapered edge may be adapted to bear, with sealing contact, on the conveyor belt.

The sealing surface or surfaces of the skirt seal may be on one side of the body and an opposite side of the body may have a formation which is adapted to engage with an edge of a chute wall for the conveyor.

BRIEF DESCRIPTION OF THE DRAWINGS

The invention is further described by way of examples with reference to the accompanying drawings in which:

FIG. 1 is a view in cross section of a skirt seal arrangement for a conveyor belt loading chute according to one form of the invention;

FIG. 2 is a perspective view of a portion of a skirt seal used in the arrangement of FIG. 1, on an enlarged scale;

FIG. 3 is a view similar to FIG. 1 of a second form of the invention;

FIG. 4 is a view similar to FIG. 1 of a third form of the invention;

FIG. 5 is a cross sectional view of the arrangement of FIG. 4, taken on the line 5—5; and FIG. 6 is a perspective view of the arrangement of FIG. 4.

DESCRIPTION OF PREFERRED EMBODIMENTS

FIG. 1 of the accompanying drawings illustrates one form of a skirt seal arrangement for a conveyor belt according to the invention.

FIG. 1 shows a side wall 10 of a conveyor loading chute, portion of a conveyor belt 12, an elongate track element 14, and a skirt seal 16 which may be made from rubber.

The lower edge of the wall 10 is spaced slightly from an upper surface of the belt 12.

The track element is made from square metal tubing and has a slot 18 in its lowermost wall which extends over its length. The track element is fixed in any suitable manner to an outer surface of the wall 10. In this instance use is made of an L-shaped bracket 19 which is fixed to an upper surface of the track element and to the wall 10 by means of bolts or welding.

FIG. 2 shows the skirt seal 16 in perspective and on a larger scale. The skirt seal includes a body 21 with a neck portion 23. A bead 20 extends on one side of the neck portion for the full length of the skirt seal, along one edge of the body. A number of grooves 24 extend parallel to one another on an opposing side of the neck portion. Adjacent the grooves are a number of ribs with sealing surfaces 25. The edge 22 of the body which is remote from the bead 20 is tapered.

The bead 20 is dimensioned so that it can fit closely inside the cavity formed by the track element 14.

The skirt seal 16 is engaged with the track element 14 by positioning the bead 20 so that it opposes the cavity of the track element and then by inserting the neck portion 23 into the slot 18 of the track element. The seal is manually fed into and along the track element to the required extent. Any suitable stop, not shown, is located across the track element cavity, at a desired point, to arrest movement of the seal into and along the track element.

As the seal is fed into the track element in the aforementioned manner, the skirt seal is bent so that the neck portion 23 passes below a lower edge of the chute wall 10. The sealing surfaces 25 of the skirt seal are thereby brought into contact with the upper edge surface of the conveyor belt.

The grooves 24 on the under surface of the seal 16 serve two purposes. Firstly the grooves reduce the area of the contact surfaces between the skirt seal and the conveyor belt. This reduces frictional wear on the belt. Secondly material which enters the interface between the conveyor belt 12 and the edge 22 of the skirt seal can migrate up the slope of the belt and enter the groove 24 which is closest to the edge 22. Material which may migrate further up the belt will more than likely be trapped in the second or the third groove. In this way abrasive contact between this material and the belt surface is reduced while at the same time the escape of this material from the belt surface is hindered.

It can be seen from FIG. 1 that the grooves 24 have sloping forward faces 27. These encourage material trapped in the grooves to track from the grooves back on to the belt 12 and this helps to prevent material blockages in the grooves.

It is to be borne in mind that the number, sizes and spacings of the grooves are not limited to what is shown in FIGS. 1 and 2 but can be of any design or configuration to suit any particular requirement.

The skirt seal shown in FIGS. 1 and 2 may include a raised shield formation 26 which is shown in dotted lines in FIG. 1. This shield at least partly covers a gap between a lower edge of the wall 10 and the upper surface of the seal 16. This reduces the entry of material from the conveyor belt 12 into the space between the upper surface of the seal 16 and the outer surface of the wall 10. Excessive material in the space can ultimately displace the seal to the right in the drawing, thereby moving the seal from the surface of the conveyor belt.

FIG. 3 shows a seal arrangement which is similar in many respects to that illustrated in FIG. 1. However the track element 14 is replaced by a track element 14A which has an integral flange 14B which facilitates its attachment to the wall 10. Also the skirt seal 16 has an outwardly projecting lip 28 which, when the seal is folded to engage with the upper surface of the belt 12, engages with the lower edge of the wall 10 thereby to reduce the likelihood that material on the belt can pass under the wall.

The skirt seals shown in FIGS. 1, 2 and 3 have been found to work particularly satisfactorily with fine materials and relatively light impact loads. The upper curved surfaces of the seals, shown in FIGS. 1 and 3, are exposed to impact loads from above, arising when material falls within the chute on to the conveyor belt 12, and provided these loads are not excessive the seals remain in position.

When the impact loading is increased, for example if large lumps of material are discharged on to the belt 12, the seal, riding over the belt, absorbs at least a portion of the impact and this leads to damage and ultimately to destruction of the seal.

A second factor is that, again with larger particulate material, particles of the material can become jammed between the lower edge of the chute and the upper seal surface. This will also lead to rapid wear of the seal.

FIGS. 4, 5, and 6 depict a skirt seal arrangement which, depending on the circumstances, is better suited for use with coarser materials and high impact loads.

In FIGS. 4, 5 and 6 reference numerals which are the same as those in FIGS. 1 to 3, are used to indicate like components.

FIG. 4 depicts a side wall 10 of a chute positioned above a conveyor belt 12. Mounted to the side wall 10 is an elongate bracket 40 which has a top-hat profile as shown in FIG. 5. The bracket 40 has a vertically extending slot 42, as may be seen in FIG. 6.

An elongate track element 14 is engaged with an angle member 44. The angle member is secured to the bracket 40 by means of a bolt 46 which is engaged with the slot 42 and with a corresponding hole in the angle member.

As is shown in FIG. 6 the side wall 10 has a plurality of the brackets 40 attached to it at regular intervals and these provide support for the track element 14 along its length.

The track element 14 has a lip 48 and an outer wall 50 which extends downwardly for some distance below the lip 48.

A skirt seal 52 is engaged with the track element 14. This skirt seal has a base 53, consisting of a bead 20 and a base section 54, which is complemental to the track element and which fits fairly tightly, with a sliding action, into the interior of the track element.

The skirt seal 52 is elongate and is engaged with the track element in a manner which is analogous to that described in connection with FIGS. 1 and 3.

The skirt seal 52 is preferably made from a plastics material such as polyurethane with a hardness of approximately 80 to 85. This is given merely by way of example and any other material which exhibits good wearing characteristics and which possesses the required degree of flexibility may be used instead.

Depending from the base 53 is an elongate tapered section 56 which terminates in a tapered edge 58. The direction of the taper of the edge 58 is opposite to the direction of the taper of the edges 22 of the seals of FIGS. 1 and 3. In FIGS. 1 and 3 a seal is achieved by having the skirt seal resting, in a curved configuration, on the surface of the belt 12. In the FIG. 4 arrangement however a seal is achieved by the tapered edge 58 being in contact with an opposing surface of the belt 12.

The material from which the skirt seal 52 is made is stiffer than the material from which the skirt seal 16 is made but on the other hand the skirt seal 52 is sufficiently flexible to permit it to bend about a lower edge 60 of the wall 50 when subjected to sideways loading by material on the belt 12. The base 53, fitting closely inside the track element, does not move relatively thereto, and thus the skirt seal can only move, under load by, bending about the edge 60. On the other hand the material is not so flexible that the tapered section 56 is capable of easily bending about a longitudinal axis when subjected to impact loads. Thus what happens is that when the belt 12 is laden, material in contact with the inner surface of the tapered section 56 urges the skirt seal outwardly thereby keeping the lower edge 58 in contact with the belt 12. The flexure of the section which takes place is allowed for and controlled by the dimensions of the tapered section 56 and the base 54 and by the length of the wall 50.

The tapered edge 58 is subjected to wear due, inter alia, to the relative movement between the belt and the seal. At regular intervals, the bolts 46 can be loosened and the entire skirt seal arrangement can be moved downwardly to compensate for the wear whereupon the bolts are tightened to secure the skirt seal in the desired position.

It is also possible to cater for the wear of the skirt seal in other ways. For example, the skirt seal could be supported by any means which constantly exerts a downwardly directed force which urges the tapered edge 58 into contact with the belt 12. It is possible in this respect to make use of springs or extensible piston and cylinder arrangements. For example, springs may act between the angle member 44 and the track element 14 to urge the track element downwardly relatively to the angle member. Alternatively, a spring may act between the angle member 44 and the bracket 40 or the wall 10 to urge the angle member downwardly relatively to the wall. Another possibility is to make use of hydraulic or pneumatic cylinders which may be activated constantly or on demand to apply downwardly directed forces to the skirt seal arrangement.

I claim:

1. A belt conveyor skirt seal arrangement for a conveyor belt comprising:

an elongate track element having an elongate cavity with an elongate slot extending into said cavity, said track extending generally in a direction of movement of the conveyor belt;

means for securing said track element to a wall of a chute of the conveyor and including means for vertically adjusting said track element relative to said wall of said chute; and an elongate skirt seal having an elongate bead and at least one sealing surface, said elongate skirt seal extending from said track element below a lower edge of said chute wall and having a formation which engages said lower edge, said elongate skirt being slidably engageable with said track element while said track element is secured to said wall of said chute by insertion of said bead into said cavity and by sliding movement of said skirt seal relative to said track element, said at least one sealing surface being in sealing contact with the conveyor belt.

2. The skirt seal arrangement of claim 1 wherein said sealing surface is urged toward the belt when said skirt seal is subjected to loading by material on the belt.

3. An arrangement according to claim 1 wherein said skirt seal has an elongate neck portion which passes through said slot.

4. An arrangement according to claim 1 wherein said skirt seal has at least two of said sealing surfaces which are separated by a groove.

5. An arrangement according to claim 1 wherein said skirt seal has a tapered edge which is remote from said track element and which is in sealing contact with the conveyor belt.

* * * * *